US008956080B2

(12) United States Patent
Berg

(10) Patent No.: US 8,956,080 B2
(45) Date of Patent: Feb. 17, 2015

(54) OPTIMIZATION OF SIZE ON UMBILICAL REPAIR JOINTS FOR DEEP WATER

(71) Applicant: Nexans, Paris (FR)

(72) Inventor: Christer Berg, Sarpsborg (NO)

(73) Assignee: Nexans, Paris (FR)

( * ) Notice: Subject to any disclaimer, the term of this patent is extended or adjusted under 35 U.S.C. 154(b) by 0 days.

(21) Appl. No.: 13/939,275

(22) Filed: Jul. 11, 2013

(65) Prior Publication Data
US 2014/0161536 A1 Jun. 12, 2014

(30) Foreign Application Priority Data
Sep. 24, 2012 (NO) .................................. 20121077

(51) Int. Cl.
H02G 15/10 (2006.01)
G02B 6/00 (2006.01)
H02G 15/14 (2006.01)

(52) U.S. Cl.
CPC .................. *H02G 15/10* (2013.01); *G02B 6/00* (2013.01); *H02G 15/14* (2013.01)
USPC ....................................... 405/184.1; 285/114

(58) Field of Classification Search
USPC ......... 405/184.1, 184.3; 285/120.1, 114, 115; 385/60
See application file for complete search history.

(56) References Cited

U.S. PATENT DOCUMENTS

| 5,655,794 A * | 8/1997 | Sell ................................. 285/25 |
| 2010/0038899 A1 * | 2/2010 | Clover et al. .............. 285/120.1 |
| 2010/0052316 A1 * | 3/2010 | Smith .......................... 285/223 |
| 2011/0198092 A1 * | 8/2011 | Machin et al. ................ 166/349 |

* cited by examiner

*Primary Examiner* — Benjamin Fiorello
(74) *Attorney, Agent, or Firm* — Sofer & Haroun, LLP

(57) ABSTRACT

An assembly for splicing and repairing an umbilical is provided having two terminal bend restrictors and two strain terminators, here each terminal bend restrictor has at least two interconnected modules, a connecting end, and a free end. The strain terminators have a strain receiving end and a strain providing end, with each of the strain receiving ends is connected to one of the connecting ends of the terminal bend restrictors. The assembly further has an intermediate bend restrictor having at least two interconnected modules and two connecting ends. The two strain terminators are connected at their strain providing ends to separate connecting ends of the intermediate bend restrictor, and the intermediate bend restrictor is dimensioned to withstand tensile strain from the connected strain terminators.

8 Claims, 4 Drawing Sheets

OPTIMIZATION OF SIZE ON UMBILICAL REPAIR JOINTS FOR DEEP WATER

RELATED APPLICATION

Figure 1:
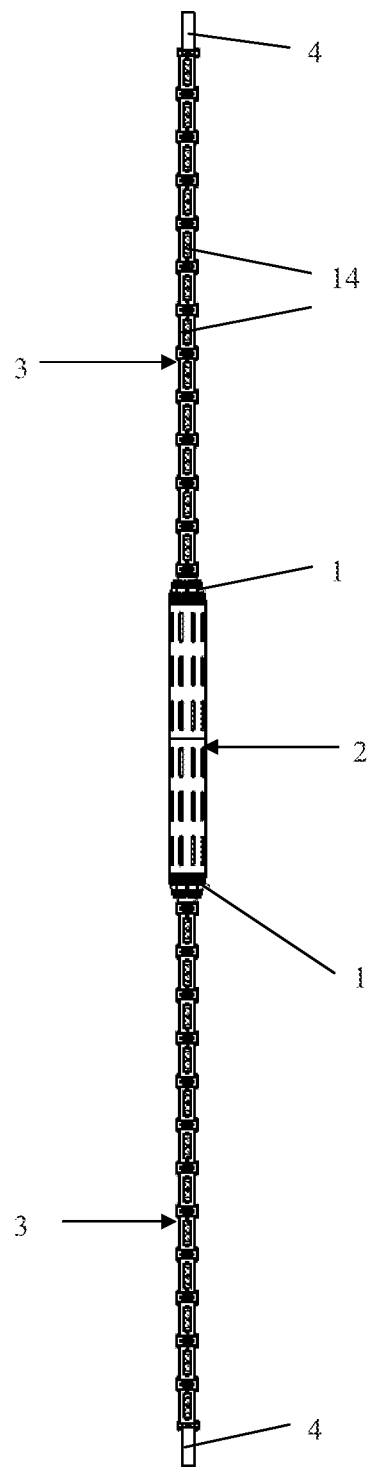

This application claims the benefit of priority from Norwegian Patent Application No. 2012 1077, filed on Sep. 24, 2012, the entirety of which is incorporated by reference.

FIELD OF THE INVENTION

The present invention concerns power umbilicals for deep water application, and more specifically an assembly for repairing such umbilicals by a factory splice.

BACKGROUND

Power umbilicals for deep water applications are commonly used in many offshore installations. Such umbilicals may be subjected to substantial laying and service loads and load combinations, as well as mechanical abrasions. In case of failure, an umbilical needs to be repaired, and this often requires splicing of said umbilical. The deep water application, and the correspondingly high hydrostatic pressure on a subsequent repair/splice joint, prevents such an umbilical from being repaired by simply splicing the power phases with for instance a ferrule. Thus, a full splice of the power phases is needed. Such a full splice requires that a bare section of each of the power phases to be spliced is initially set in a linear orientation with each other. The minimum length of these sections depend on the capacity of the power phase, and may in the case of a high-capacity umbilical reach a total length of more than 8 m. The required length of the bare power phases are due to the splicing area tube (insulation for the bare section of the umbilical which is spliced) which is initially threaded onto one the end of one of the umbilical sections being spliced. During the splicing operation this tube is compressed onto the one umbilical section. After the power phases are spliced the tube is also threaded onto the other umbilical section to cover the whole length of the bare power phase. When applying existing solutions for a full splice, this requirement makes the total length of a common full repair/splice joint too large to be handled by a normal installation vessel, and may in fact make such a repair splice impossible to perform using equipment available today.

In existing solutions for full splicing, the repair/splice joint consists of a rigid longitudinal repair joint housing (or splice housing) having strain terminators connected to each end of said housing. In addition to the repair joint housing and the strain terminators, a common splice assembly further comprises bend restrictors connected to the strain terminators on each side of the rigid repair joint housing. The bend restrictors are made up of multiple interlocking modules enclosing the umbilical. The modules are connected to each other such that only a certain angular displacement is possible between them. Depending on the number of modules in the bend restrictor, the enclosed umbilical will be restricted to a given angular radius.

Consequently, based on the state of the art, a need exists for a solution which provides for a repair splice joint, wherein the rigid section, i.e. the repair joint housing and the connected strain terminators, is much smaller in size.

SUMMARY OF THE INVENTION

The present invention provides an umbilical repair/splice joint, wherein the total length of the optional rigid splice housing allows it to be handled by a normal size installation vessel. By moving and incorporating the strain terminators, that are commonly connected to each end of the splice housing, into the corresponding bend restrictors, a shorter repair/splice joint housing is obtained. The section of the bend restrictor which now is situated between the strain terminator and the splice housing must further be dimensioned to take up the tensile strain from the umbilical. By moving the strain terminator(s) away from the splice housing, the length of the rigid splice housing is shortened since it no longer has to accommodate coupling means for the strain terminators and the strain terminators themselves. In addition, the splice housing may be further shortened since it no longer has to accommodate the whole length of the splice due to the relocation of the strain terminators. In case of umbilicals which do not comprise optical fibers, the splice housing may even be removed and replaced by a single bend restrictor section. When splicing umbilicals comprising optical fibers there is still a need for a splice housing to accommodate the connection box for the optical fiber splice. The present invention is further specified in the following:

The present invention provides an assembly for splicing and/or repairing an umbilical, said assembly comprises two terminal bend restrictors and two strain terminators, each terminal bend restrictor comprises at least two interconnected modules, a connecting end and a free end, and the strain terminators comprise a strain receiving end and a strain providing end, each of said strain receiving ends is connected to one of the connecting ends of the terminal bend restrictors, wherein the assembly comprises an intermediate bend restrictor comprising at least two interconnected modules and two connecting ends, and that the two strain terminators are connected at their strain providing ends to separate connecting ends of the intermediate bend restrictor, and the intermediate bend restrictor is dimensioned to withstand tensile strain from the connected strain terminators. The tensile strain from the strain terminators are at least equal to the strain transferred from the armoring wires of an umbilical connected to the strain terminators. In an assembly according to the present invention, the intermediate bend restrictor may comprise a splice housing able to accommodate an enclosure for an optical cable splice. The enclosure is often in the form of a box which contains the optical fiber splice. The splice housing must be dimensioned to withstand tensile strain from the intermediate bend restrictor and/or a connected strain terminator. In an assembly according to the invention an intermediate bend restrictor may comprise a splice housing and two minor bend restrictors, each minor bend restrictor comprises at least two interconnected modules and two connecting ends, and each of the minor bend restrictors are connected to the splice housing by one of the connecting ends.

In an assembly according to the invention, the strain receiving end of a strain terminator comprises means for fixating one or more tensile strain bearing elements, or layers, of an umbilical, the strain bearing elements, or layers, may comprise armoring wires.

In an assembly according to the invention, the intermediate bend restrictor has tensile strain tolerance, said tolerance is preferably at least equal to the tolerance of strain providing elements, or layers, of an umbilical to be spliced or repaired.

The umbilical to be repaired and/or spliced by an assembly according to the present invention may be a subsea umbilical.

In an assembly according to the invention, the umbilical to be repaired and/or spliced may comprise a power phase, or a combination of power phases, intended for a voltage of more than about 12 kV. The assembly according to the invention is highly advantageous for repairing and/or splicing power phases, or combinations of power phases, of about 12 kV or more, and in many instances even more advantageous for power phases, or combination of power phases, of more than 24 kV, 48 kV or 100 kV, respectively. The upper limit concerning the voltage of the power phase, combination of power phases, is only restricted by the practical size of the umbilical to be repaired and/or spliced. In practice the voltage of the power phase, combination of power phases, would not exceed 1000 kV. The voltage of the power phase, or combination of power phases, may advantageously be in the range of 12 kV-1000 kV, 12 kV-500 kV, 12 kV-100 kV, 12 kV-48 kV, 24 kV-100 kV or 24 kV-48 kV.

Also included in the present invention is the use of any assembly according to the present invention for the repair and/or splicing of a subsea umbilical.

SHORT DESCRIPTION OF THE DRAWINGS

FIG. 1: An umbilical splice assembly designed by use of known techniques.

Figures 2A, 2B:
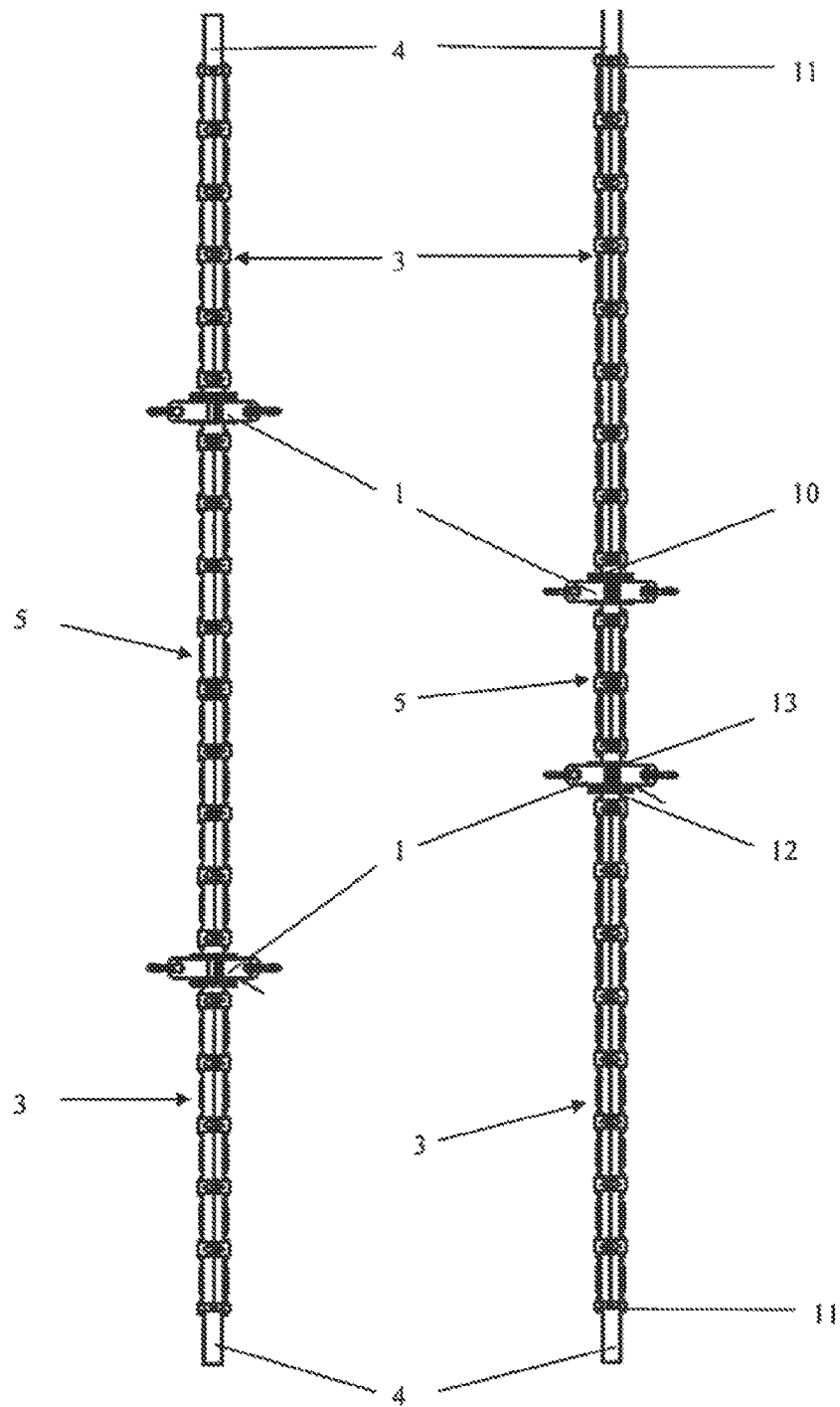

FIGS. 2A and B: Embodiments of umbilical splice assemblies according to the present invention, wherein the umbilical does not comprise an optical fiber cable.

Figure 3:
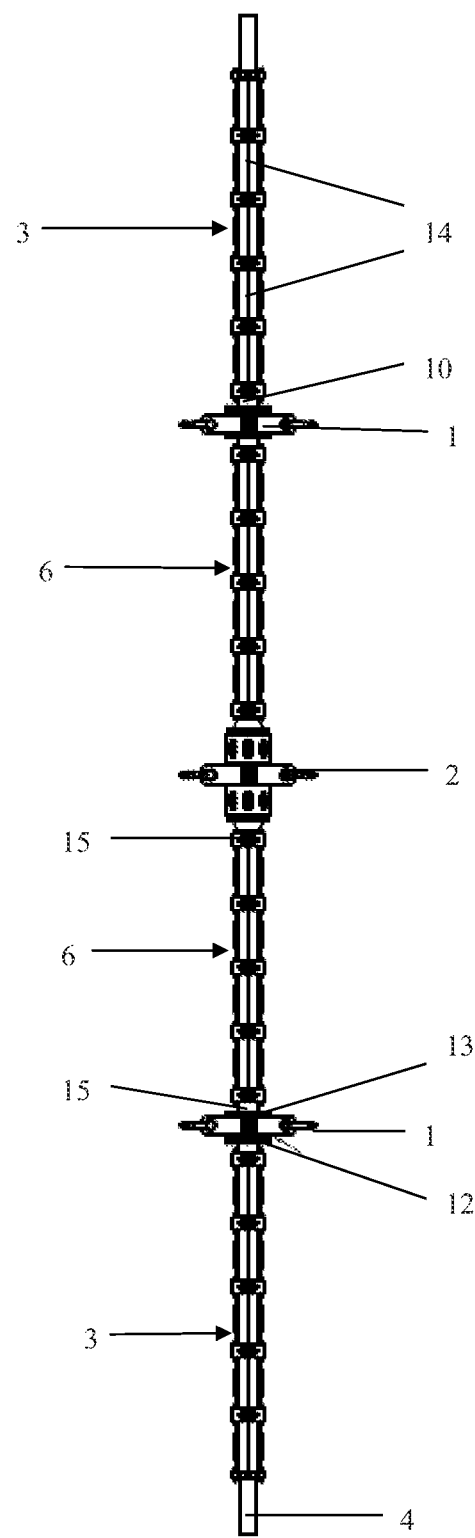

FIG. 3: An embodiment of an umbilical splice assembly according to the present invention, wherein the umbilical comprises an optical fiber cable.

Figure 4:
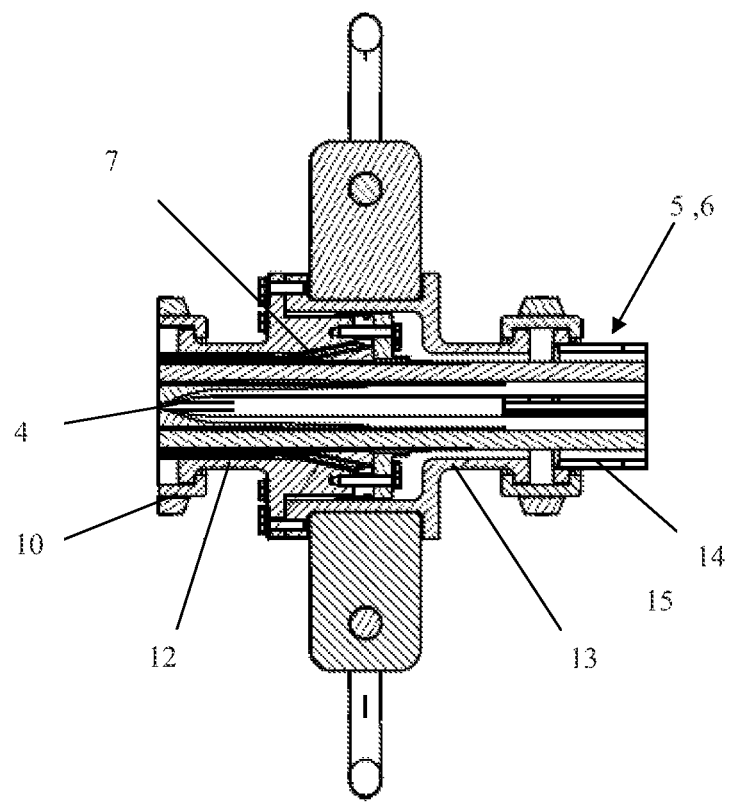

FIG. 4: A cross-section view of a strain terminator.

Figure 5:
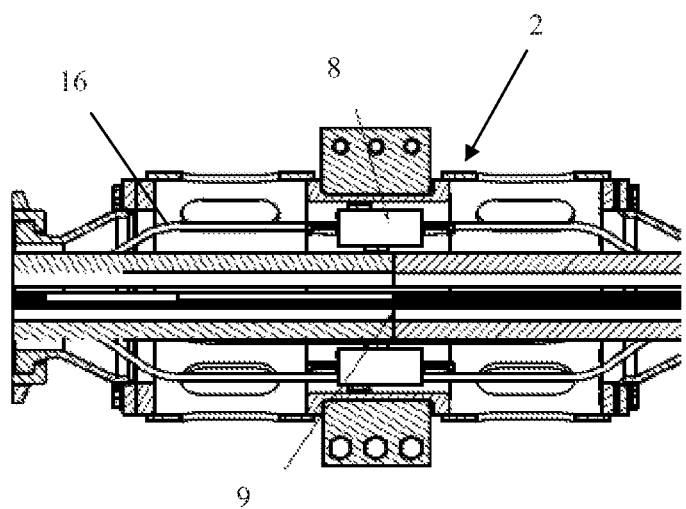

FIG. 5: A cross-section view of a splice housing.

DETAILED DESCRIPTION OF THE DRAWINGS

FIG. 1 shows a design of an umbilical repair splice assembly where prior art solutions are used. Such a repair splice consists of a splice housing 2, a strain terminator 1 connected to each end of the housing, and a bend restrictor 3 connected to each strain terminator 1. The bend restrictors 3 are made up of multiple modules 14 connected to each other. In the strain terminators 1, the armoring wires (ref. 7 FIG. 4) of one end of an umbilical section 4 are secured. The armoring wires take up the tensile strain on a first umbilical section, transferring said strain via the strain terminators 1 and the splice repair housing 2 to the armoring wires of the second umbilical. In this way, the repair splice is not subjected to any detrimental tensile strain. The splice housing 2 of the prior art repair splice will in cases of high capacity power phases have a length/size which is incompatible with the use of normal installation vessels when an umbilical repair is required.

FIGS. 2A and B show two embodiments of a repair splice according to the invention. The main difference between the two embodiments is the length of the central or intermediate bend restrictor 5. The required length of the intermediate bend restrictor 5 will depend on the capacity of the power phase of the umbilical 4 being repaired or spliced, which again decides the necessary length of the splicing area tube. In these two particular embodiments, the umbilical 4 to be repaired/spliced does not comprise any optical fiber cables. The splice assembly comprises three separate sections of bend restrictors, one intermediate bend restrictor 5 and two terminal bend restrictors 3, interconnected by the two strain terminators 1. The bend restrictor 5 having a strain terminator at each end is dimensioned to withstand the tensile strain transferred to it from the umbilical 4 via the strain terminators 1. The strain terminators 1 have a strain receiving end 12, the end at which the armor wires of an umbilical 4 are fixated, and a strain providing end 13, the end which is connected to the intermediate bend restrictor 5. In contrast to the common solutions for such repair splice assemblies, the presently described embodiments of the invention has no rigid splice housing, and will be easy to handle by any common installation vessel. In case of repairing high-capacity power umbilical, the presence of a rigid splice housing directly connected to the strain providing ends 13 of the strain terminators 1 would lead to a splice assembly which would be too large to be handled by a normal installation vessel, and may in fact make such a repair splice impossible to perform using equipment available today.

FIG. 3 shows an embodiment of the invention, wherein the umbilical 4 to be repaired/spliced comprises an optical fiber cable (ref. 7, FIG. 4). The splicing of optical fibers requires the use of a connection box (ref. 8, FIG. 5). Such connection boxes may not be easily incorporated into a bend restrictor, and thus the repair splice requires a splice housing 2 to accommodate the connection box. The disclosed repair splice assembly comprises a splice housing 2 for incorporation of such an optical fiber connection box. The splice housing 2 is at each end connected to the strain terminators 1 via two minor intermediate bend restrictors 6. These bend restrictors 6 are dimensioned to withstand the tensile strain transferred to them from the umbilical 4 via the strain terminators 1. A second set of bend restrictors, terminal bend restrictors 3, are connected to the strain terminators 1 opposite the minor intermediate bend restrictors 6. The terminal bend restrictors 3 need not be dimensioned to withstand tensile strain from the umbilical 4. Even if the present embodiment requires a splice housing 2, said housing will be much shorter than the prior art housing shown in FIG. 1, and not too large to be handled by a normal installation vessel.

A cross-sectional view of a typical strain terminator 1 is shown in FIG. 4. The armoring wires 7 of the umbilical 4 are connected to the strain terminator at the strain receiving end 12, which again is connected via the strain providing end 13 to a connecting end of a first module 14 of a bend restrictor 5,6. In this way, the tensile strain on the umbilical 4 is transferred via the strain terminator 1 to the bend restrictor 5,6.

A cross-sectional view of a splice housing 2 used when repairing an umbilical which comprises an optical fiber cable 16 is shown in FIG. 5. The splice housing is necessary when the umbilical 4 comprises an optical fiber cable, since the splicing of an optical fiber cable requires an optical fiber connection box which is difficult to incorporate into the bend restrictor 5.

A bend restrictor is used to avoid detrimental bending of an umbilical or cable, especially at a point where said umbilical/cable is fixed or restrained. The design of bend restrictors are well known in the art, and, as described above, they are commonly made up of multiple, at least two, interconnected modules intended to fully, or partly, enclose an umbilical. The modules are connected to each other such that only a certain maximum angular displacement between them is possible. Depending on the number of modules making up the bend restrictor, the enclosed umbilical will be restricted to a given angular radius.

In the present description, the term "bend restrictor" is meant to designate a bend restrictor as described above, i.e. an assembly comprising at least two interconnected modules, the modules connected such that only a certain maximum angular displacement is possible between them.

The invention claimed is:

1. An assembly for splicing and/or repairing an umbilical, said assembly comprising:
   two terminal bend restrictors and two strain terminators,
   where each terminal bend restrictor having at least two interconnected modules, a connecting end, and a free end, and where the strain terminators have a strain receiving end and a strain providing end, each of said strain receiving ends is connected to one of the connecting ends of the terminal bend restrictors, wherein the assembly further comprises an intermediate bend restrictor having at least two interconnected modules and two connecting ends, and that the two strain terminators are connected at their strain providing ends to separate connecting ends of the intermediate bend restrictor, and the intermediate bend restrictor is dimensioned to withstand tensile strain from the connected strain terminators.

2. The assembly according to claim 1, wherein the intermediate bend restrictor further comprises a splice housing able to accommodate an enclosure for an optical cable splice.

3. The assembly according to claim 1, wherein the intermediate bend restrictor has a splice housing and two minor bend restrictors, each minor bend restrictor has at least two interconnected modules and two connecting ends, and each of the minor bend restrictors are connected to the splice housing by one of the connecting ends.

4. The assembly according to claim 1, wherein the strain receiving end of a strain terminator is connected to one or more tensile strain bearing elements, or layers, of an umbilical.

5. The assembly according to claim 4, wherein the strain bearing elements, or layers, has armoring wires.

6. The assembly according to claim 1, wherein the intermediate bend restrictor has tensile strain tolerance, said tolerance at least equal to the tolerance of strain providing elements, or layers, of an umbilical to be spliced or repaired.

7. The assembly according to claim 1, wherein the umbilical to be repaired and/or spliced is a subsea umbilical.

8. The assembly according to claim 1, wherein the umbilical to be repaired and/or spliced has a power phase, or power phases, for a voltage of more than 12 kV.

* * * * *